(12) United States Patent
Adelmann

(10) Patent No.: US 11,540,667 B2
(45) Date of Patent: Jan. 3, 2023

(54) ROTISSERIE COOKING APPLIANCE

(71) Applicant: Haier US Appliance Solutions, Inc., Wilmington, DE (US)

(72) Inventor: Christopher James Adelmann, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 557 days.

(21) Appl. No.: 16/665,482

(22) Filed: Oct. 28, 2019

(65) Prior Publication Data

US 2021/0121005 A1    Apr. 29, 2021

(51) Int. Cl.
*A47J 37/04* (2006.01)
*A47J 36/36* (2006.01)
*A47J 27/00* (2006.01)

(52) U.S. Cl.
CPC .......... *A47J 37/041* (2013.01); *A47J 27/004* (2013.01); *A47J 36/36* (2013.01); *A47J 37/04* (2013.01)

(58) Field of Classification Search
CPC ........ A47J 37/041; A47J 37/04; A47J 37/047; A47J 37/048
USPC ....................... 99/421 H, 421 HH
See application file for complete search history.

(56) References Cited

U.S. PATENT DOCUMENTS

| 1,442,584 | A | * | 1/1923 | Schey ............... A47J 37/041 126/14 |
| 4,505,195 | A | | 3/1985 | Waltman |
| 8,017,167 | B2 | | 9/2011 | Backus et al. |
| 2012/0285338 | A1 | | 11/2012 | Anderson, Sr. |

FOREIGN PATENT DOCUMENTS

| CN | 205359265 U | | 7/2016 | |
| DE | 404007 | * | 6/1966 | ........... A47J 37/041 |
| DE | 1454152 | * | 3/1969 | ........... A47J 37/041 |
| FR | 2126127 | * | 6/1972 | ........... A47J 37/041 |

* cited by examiner

*Primary Examiner* — Reginald Alexander
(74) *Attorney, Agent, or Firm* — Dority & Manning, P.A.

(57) ABSTRACT

A cooking appliance, as provided herein, may include a cabinet, a heating element, a first false wall, a second false wall, and a spit rod. The cabinet may define a cooking chamber. The cooking chamber may extend along a lateral direction between a first chamber side and a second chamber side. The heating element may be mounted within the cabinet. The first false wall may be slidably positioned within the cooking chamber at the first chamber side. The second false wall may be slidably positioned within the cooking chamber at the second chamber side. The spit rod may define a rotation axis from a first rod end to a second rod. The first rod end may be attached to the first false wall to slide therewith. The second rod end may be attached to the second false wall to slide therewith.

20 Claims, 11 Drawing Sheets

ROTISSERIE COOKING APPLIANCE

FIELD OF THE INVENTION

The present subject matter relates generally to cooking appliances, and more particularly to rotisserie cooking appliances

BACKGROUND OF THE INVENTION

Cooking appliances generally define one or more enclosures supporting one or more heating elements. For instance, oven appliances can include a cabinet defining an insulated cooking chamber therein for receipt of food items for cooking. One or more heating elements mounted within the cabinet can act to selectively heat the cooking chamber, such as through passive or active convective heating. Common appliances include an exhaust fan or conduit to direct vapor or fumes from the cooking chamber.

Certain oven appliances provide a rotating rod or spit onto which food may be secured. Such appliances are commonly described as rotisseries or rotisserie cooking appliances. One or more heating elements are generally provided and act to heat food on the spit. In some appliances, one or more fans may be provided to motivate a recirculating heated air flow. For instance, this heated air flow may in turn convectively heat the food as it rotates.

In practice, rotisseries may offer a number of advantages over other appliances or cooking methods. For instance, grease and oil are permitted to drop from food as it rests on the spit. This dripping generally results in less overall fat in the cooked food. Moreover, it ensures that the grease and oil does not settle in any one area of the food. Instead, the food is able to self-baste, evenly distributing natural oils over the surface food of the as it rotates. Compared to other cooking methods, the resulting food prepared from a rotisserie may be more healthful, moist, and evenly cooked.

In spite of the advantages provided by some rotisserie cooking appliances, various drawbacks are often found within existing appliances. For instance, common rotisseries provide a spit at a single fixed position. Such rotisseries are thus limited in the size of food items that can be held by the spit and cooked within the cooking chamber. Moreover, it can be difficult to consistently cook food items that differ in size or mass, especially if the distance to one or more heating elements varies with the volume or mass of the food item. Specifically larger food items may cook differently than smaller food items. If a single item is irregularly shaped, consistency and even heating may be an even greater problem.

As a result, it would be useful to provide a cooking appliance having features for addressing one or more of the above identified issues. In particular, it may be advantageous for a cooking appliance to include features to accommodate food items of varying sizes or ensure even heating of food items within the cooking chamber.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooking appliance is provided. The cooking appliance may include a cabinet, a heating element, a first false wall, a second false wall, and a spit rod. The cabinet may define a cooking chamber. The cooking chamber may extend along a lateral direction between a first chamber side and a second chamber side. The heating element may be mounted within the cabinet. The first false wall may be slidably positioned within the cooking chamber at the first chamber side. The second false wall may be slidably positioned within the cooking chamber at the second chamber side. The spit rod may define a rotation axis from a first rod end to a second rod. The first rod end may be attached to the first false wall to slide therewith. The second rod end may be attached to the second false wall to slide therewith.

In another exemplary aspect of the present disclosure, a cooking appliance is provided. The cooking appliance may include a cabinet, a plurality of electric heating elements, a first false wall, a second false wall, a spit rod, and a heat shield. The cabinet may define a cooking chamber. The cooking chamber may extend along a lateral direction between a first chamber side and a second chamber side. The plurality of electric heating elements may be mounted within the cabinet. The first false wall may be slidably positioned within the cooking chamber at the first chamber side. The second false wall may be slidably positioned within the cooking chamber at the second chamber side. The second false wall may be independently slidable relative to the first false wall. The spit rod may define a rotation axis from a first rod end to a second rod. The first rod end may be attached to the first false wall to slide therewith. The second rod end may be attached to the second false wall to slide therewith. The heat shield may be mounted within the cabinet rearward from the spit rod. The heat shield may extend along a shield plane from a first end to a second end.

The cooking appliance may include a cabinet, a heating element, a first false wall, a second false wall, and a spit rod. The cabinet may define a cooking chamber. The cooking chamber may extend along a lateral direction between a first chamber side and a second chamber side. The heating element may be mounted within the cabinet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
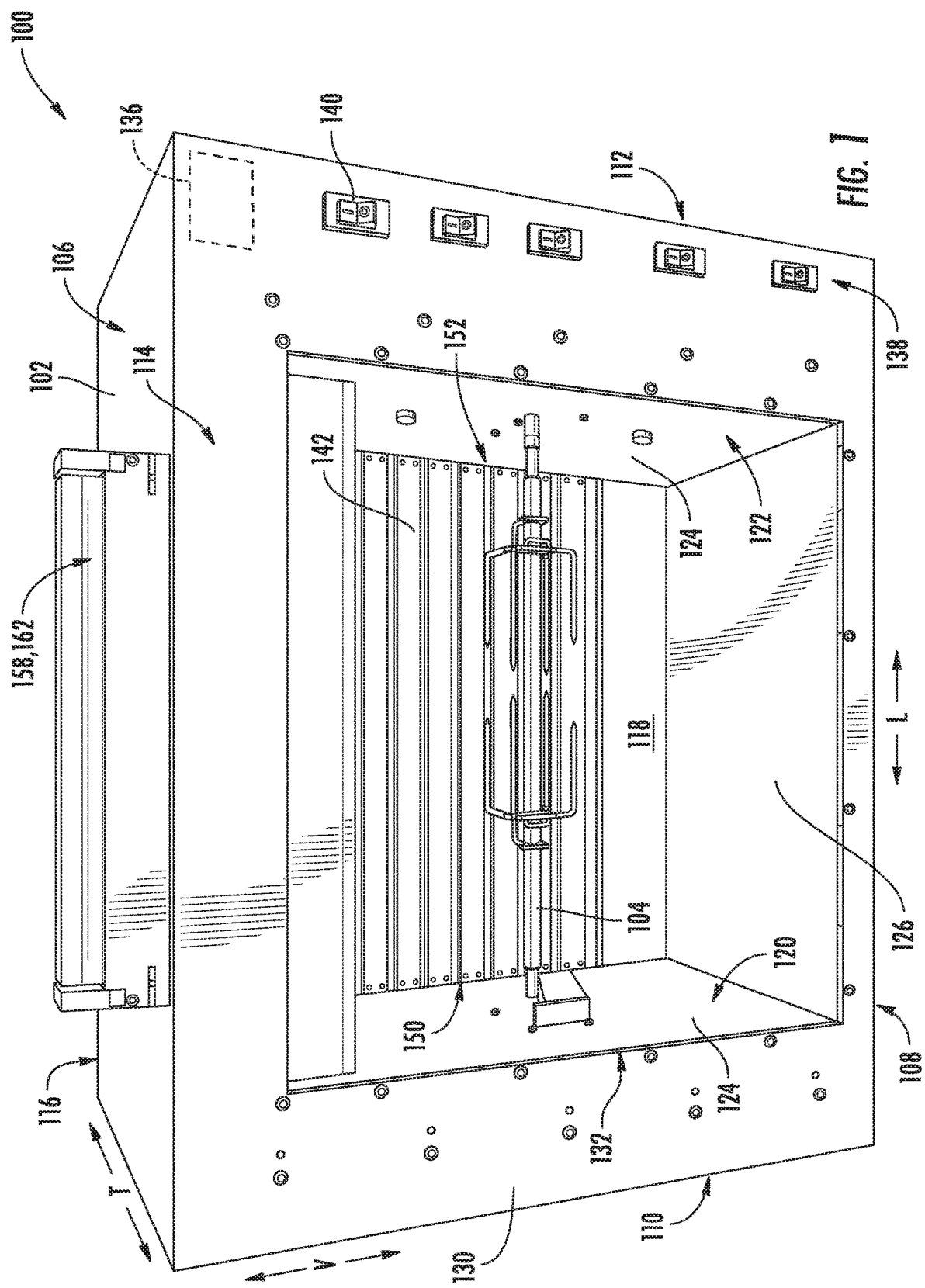
FIG. 1 provides a front perspective view of a rotisserie cooking appliance according to exemplary embodiments of the present disclosure.
Figure 2:
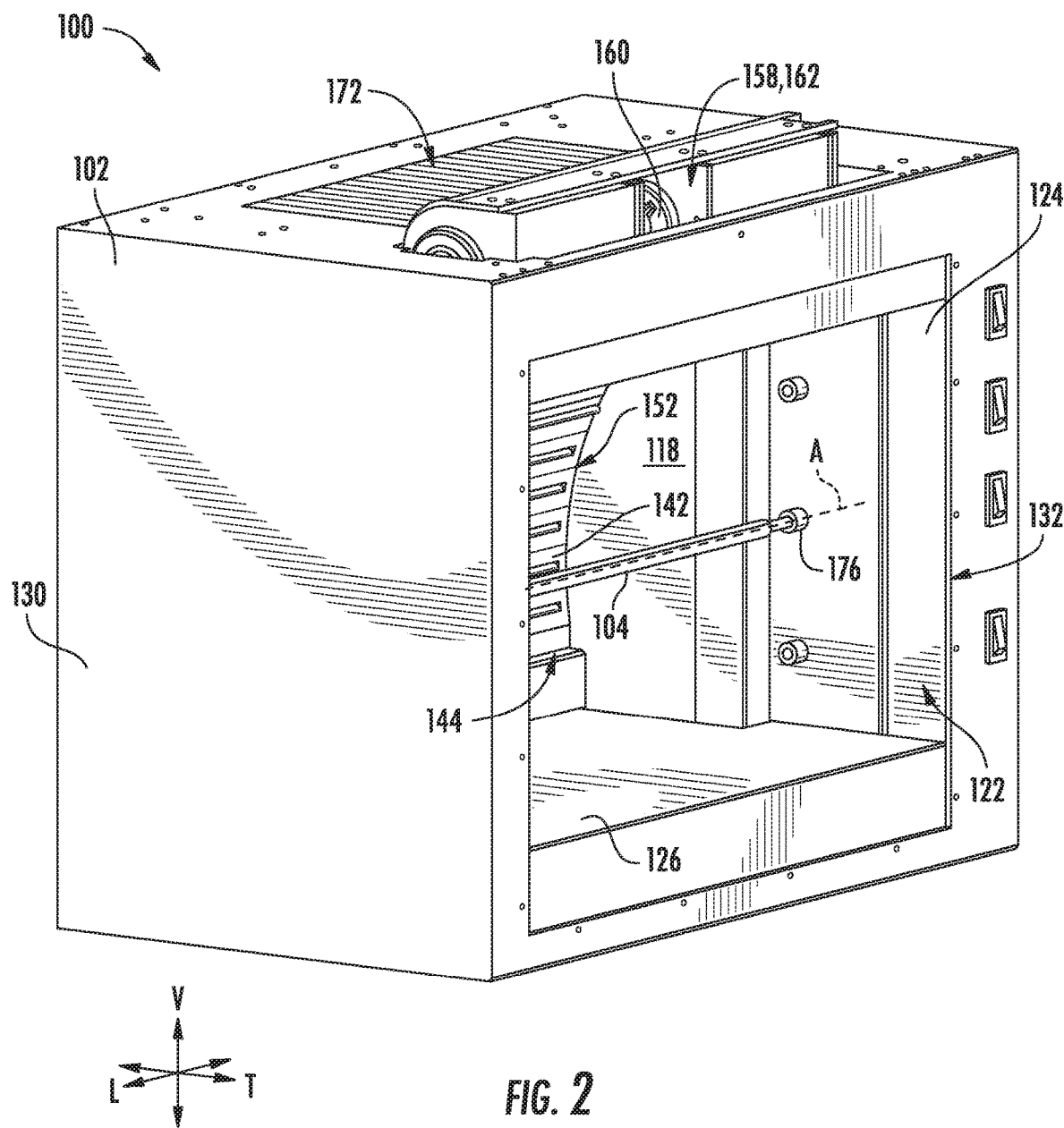
FIG. 2 provides a side perspective view of the exemplary rotisserie cooking appliance of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The term "or" is generally intended to be inclusive (i.e., "A or B" is intended to mean "A or B or both").

Turning now to the figures, FIGS. 1 through 4 provide various views of a cooking appliance 100 according to exemplary embodiments of the present disclosure. Specifically, as described in detail below, appliance 100 may be provided with one or more rotisserie elements or spit rods 104, and may thus be described as a rotisserie cooking appliance. Nonetheless, it is understood that, except as otherwise provided herein, the present disclosure is not limited to any one style, model, or configuration of cooking appliance.

Figure 3:
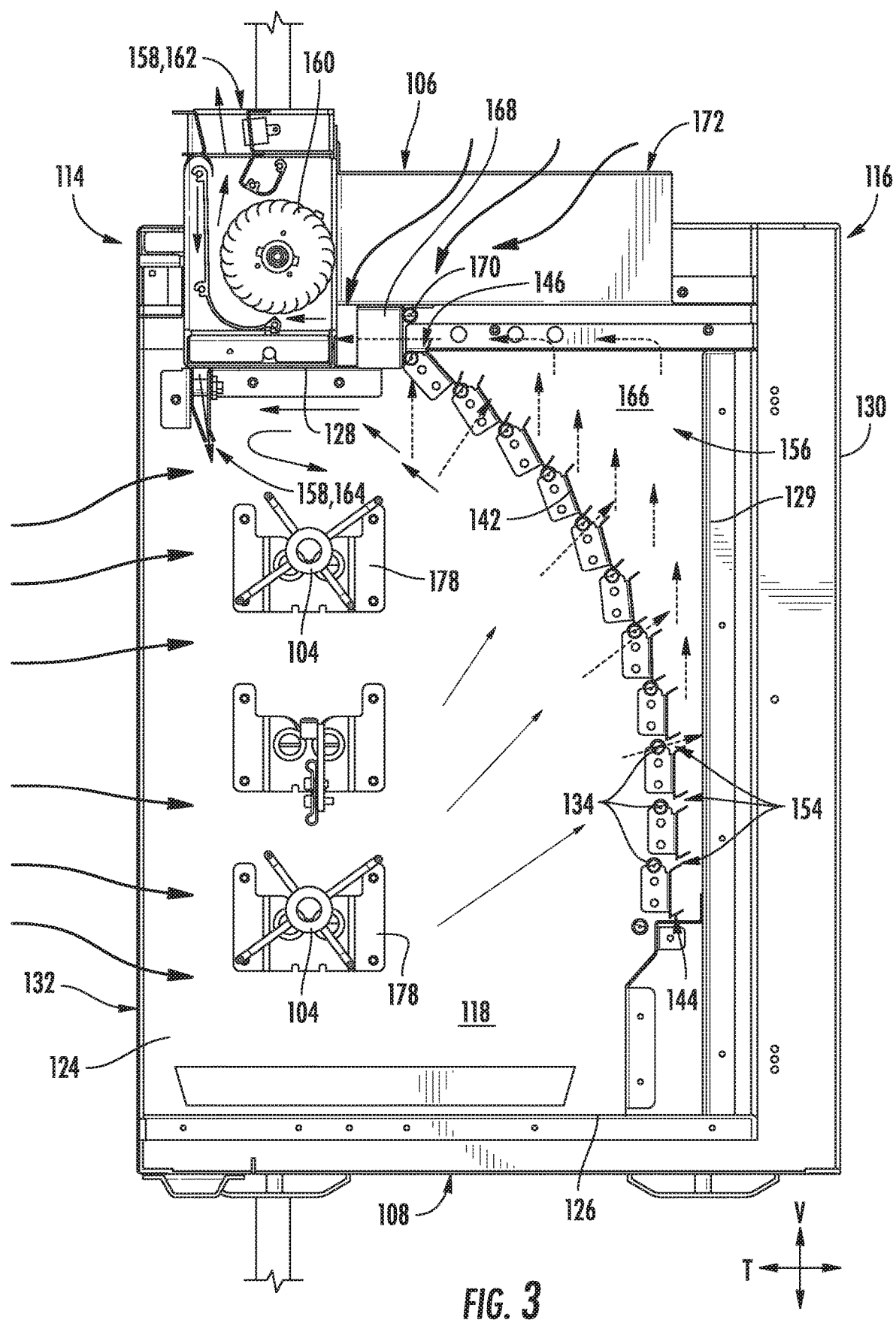
FIG. 3 provides a sectional view of a rotisserie cooking appliance according to exemplary embodiments of the present disclosure.
Figure 4:
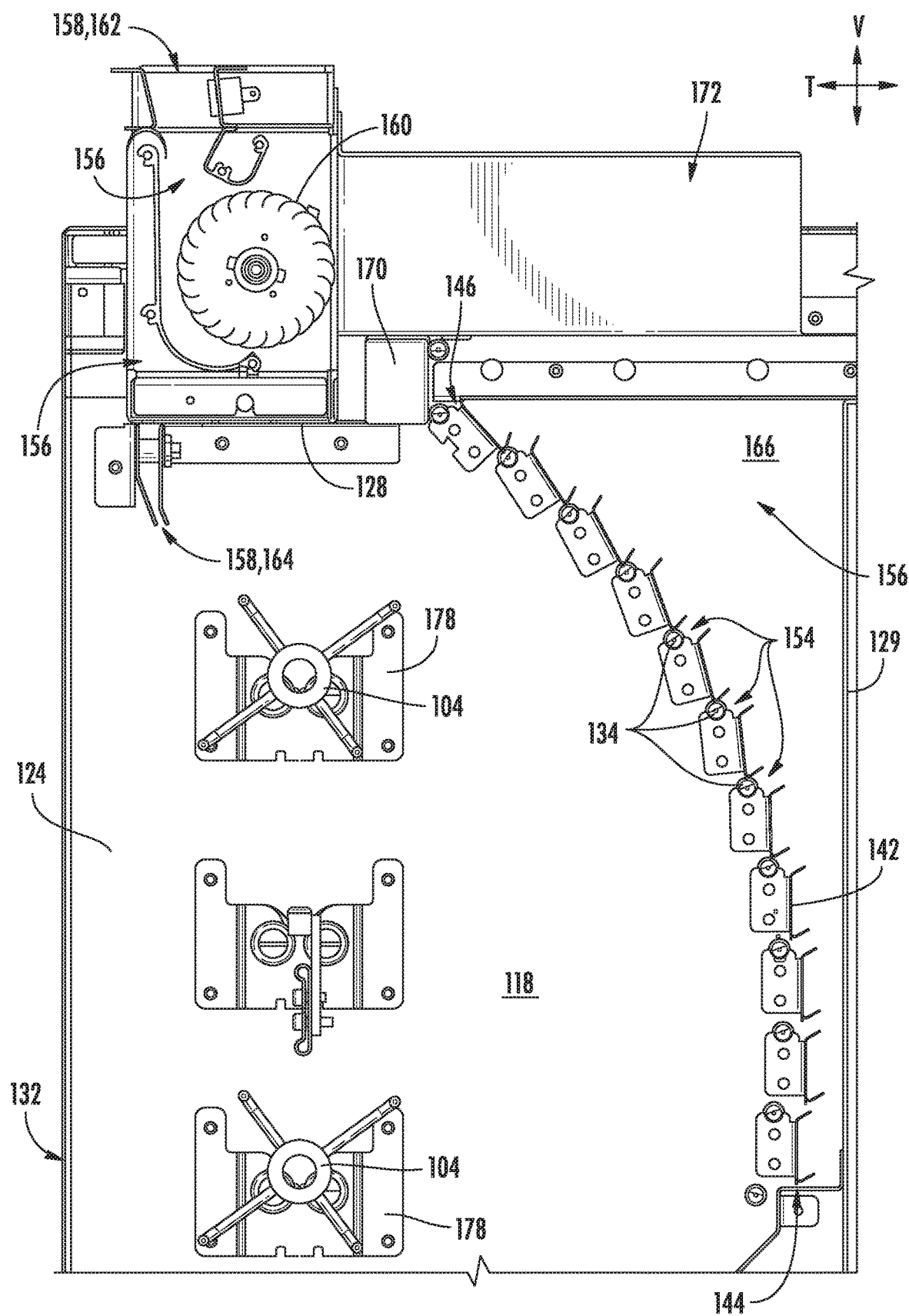
FIG. 4 provides a magnified sectional view of a portion of the exemplary rotisserie cooking appliance of FIG. 3.

As shown, appliance 100 includes a cabinet 102 that extends along a vertical direction V from a top portion 106 to a bottom portion 108, along a lateral direction L from a left portion 110 to a right portion 112, and along a transverse direction T from a front portion 114 to a rear portion 116. Each of the vertical, lateral, and transverse directions may be mutually-orthogonal and thus define an orthogonal coordinate system. Cabinet 102 may be freestanding (e.g., for use on a countertop) or radially supported (e.g., within a wall mount, as illustrated in FIG. 3).

When assembled, appliance 100 generally defines a cooking chamber 118 therein that extends (e.g., along the lateral direction L) between a first chamber side 120 and a second chamber side 122. For example, one or more interior walls (e.g., inward from an outer casing 130 or set of walls) may define cooking chamber 118 to selectively receive one or more food items to be cooked. In some embodiments, the interior walls may include a pair of interior sidewalls 124 disposed at opposite chamber sides 120, 122. In additional or alternative embodiments, an interior bottom wall 126 defines a bottom chamber end while an interior top wall 128 defines a top chamber end. Together, the interior walls may at least partially define an opening 132 (e.g., at a front portion 114 of cabinet 102) through which a user may access cooking chamber 118, such as to insert or remove food. Optionally, opening 132 may be formed as an uncovered opening, unimpeded by any door or solid physical barricade to restrict user access to cooking chamber 118.

Within cabinet 102 one or more heating elements 134 (e.g., resistive elements, gas burner tubes, etc.) are provided to selectively heat cooking chamber 118. In some embodiments, such as those illustrated in FIGS. 1 through 4, the heating elements 134 are electric heating elements 134 configured to generate heat in response to a received electrical current. For instance, the electric heating elements 134 may include or be provided as resistive elements (e.g., resistance wires, ceramic heaters, infrared radiant heat elements, etc.). Generally, heating elements 134 are in thermal communication with cooking chamber 118. In certain embodiments, heating elements 134 are disposed within cooking chamber 118. Optionally, one or more heating elements 134 extend along the lateral direction L between the chamber sides 120, 122 (e.g., from first chamber side 120 to second chamber side 122).

In some embodiments, appliance 100 is further equipped with a controller 136 to regulate operation of the appliance 100. For example, controller 136 may regulate the operation of appliance 100 including heating elements 134. Controller 136 may be in operable communication (via for example a suitable wired or wireless connection) with the heating elements 134 and other suitable components of the appliance 100, as discussed herein. In general, controller 136 may be operable to configure the appliance 100 (and various components thereof) for cooking. Such configuration may be based one or more cooking factors, such as a selected operating cycle, sensor feedback, etc.

By way of example, controller 136 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

Controller 136 may be positioned in a variety of locations throughout appliance 100. In optional embodiments, controller 136 is located within a user interface panel 138 of appliance 100. In such an embodiment, input/output ("I/O") signals may be routed between the control system and various operational components of appliance 100 along wiring harnesses that may be routed through cabinet 102. Typically, controller 136 is in communication with user interface panel 138 and controls 140 through which a user may select various operational features and modes and monitor progress of appliance 100. In some embodiments, user interface panel 138 represents a general purpose I/O ("GPIO") device or functional block. In additional or alternative embodiments, user interface panel 138 includes input components or controls 140, such as one or more of a variety of electrical, mechanical or electro-mechanical input devices including rotary dials, push buttons, rocker switches, and touch pads. User interface panel 138 may include a display component, such as a digital or analog display device designed to provide operational feedback to a user. Controller 136 may be in communication with user interface panel 138 or other components of via one or more signal lines or shared communication busses. Controller 136 may also be in communication with various components of appliance 100.

Figure 6:
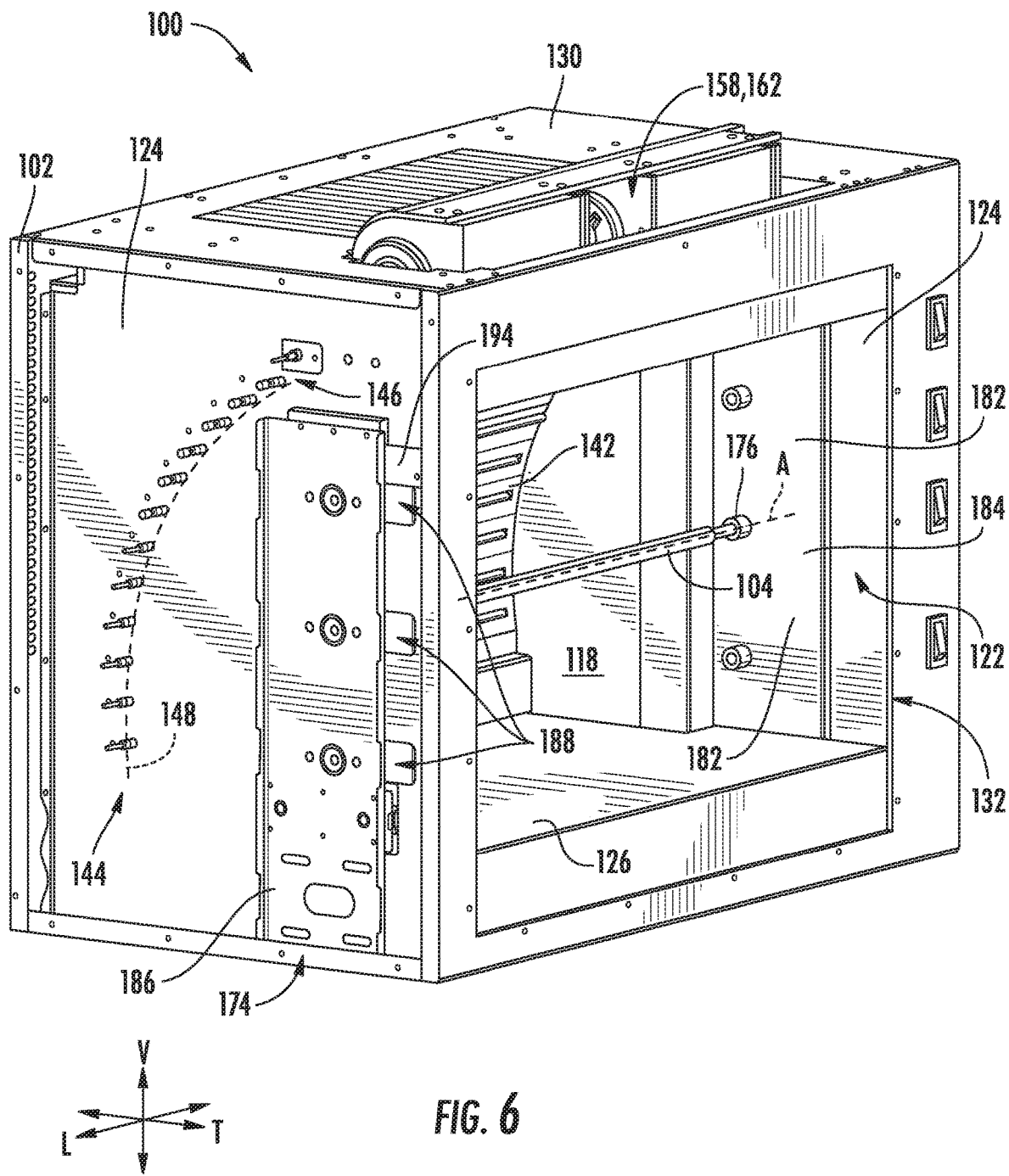
FIG. 6 provides a side perspective view of a rotisserie cooking appliance according to exemplary embodiments of the present disclosure, wherein a portion of an outer casing has been removed for clarity.
Figure 7:
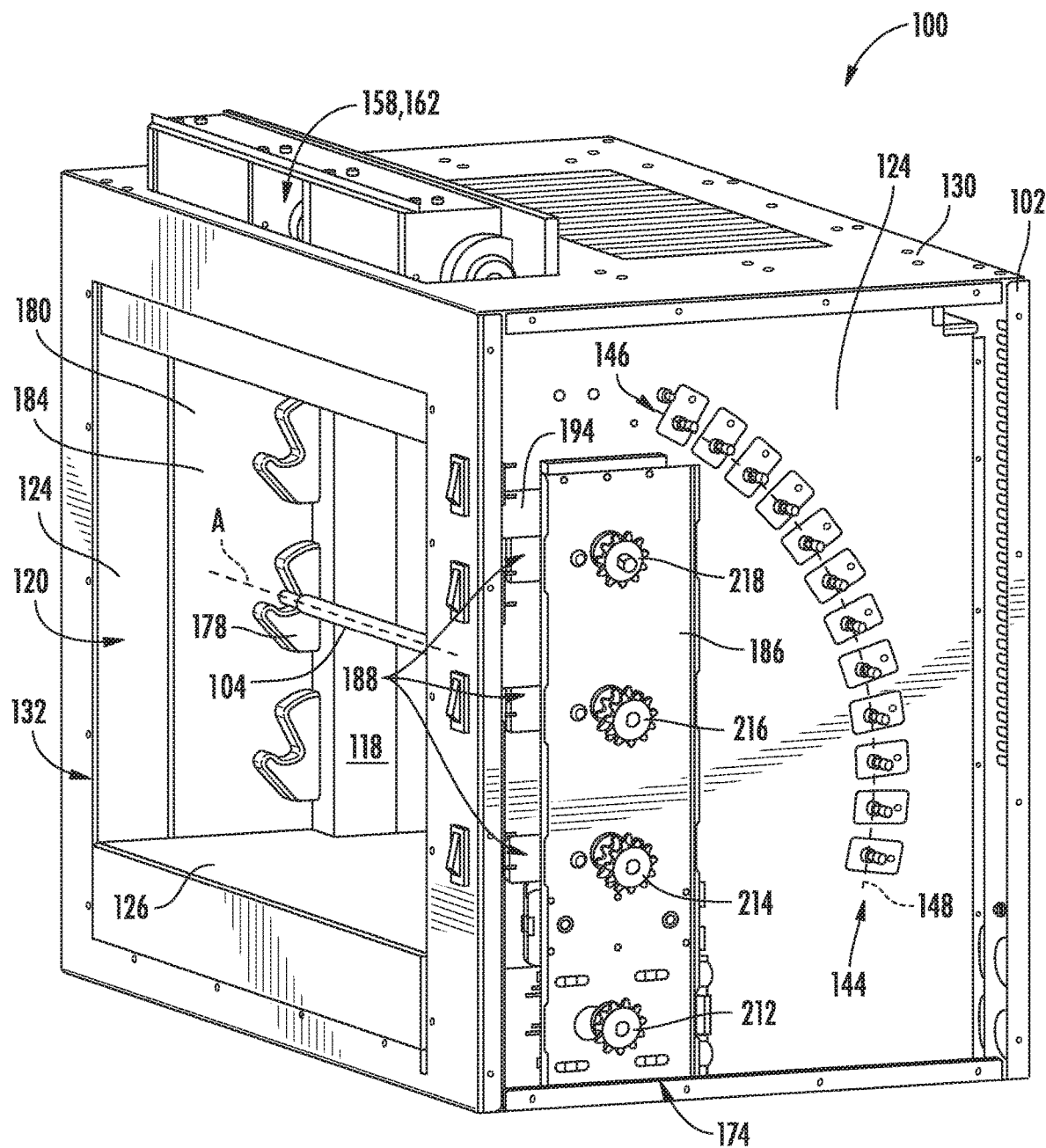
FIG. 7 provides a side perspective view of a rotisserie cooking appliance according to exemplary embodiments of the present disclosure, wherein a portion of an outer casing has been removed for clarity.
Figure 8:
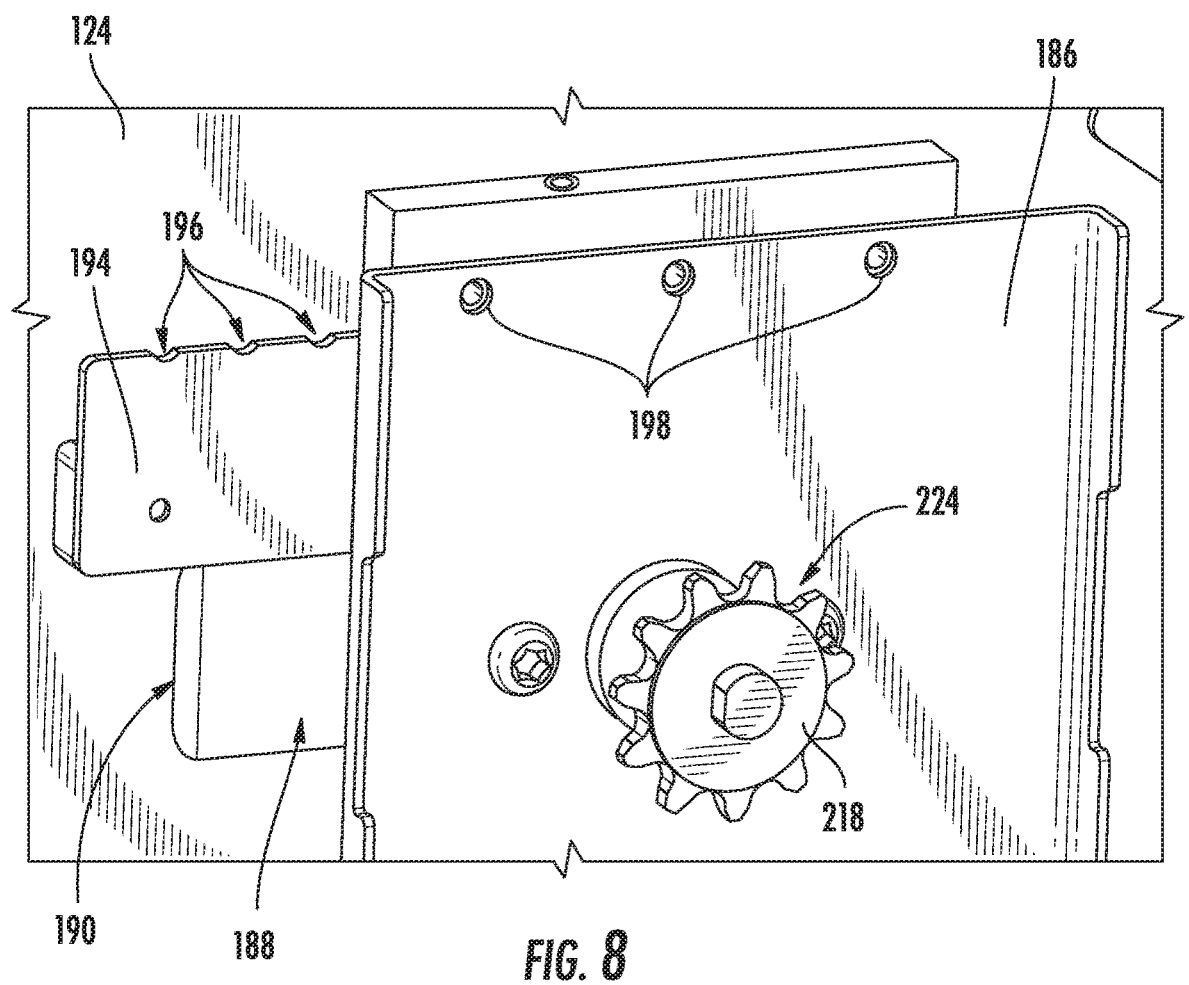
FIG. 8 provides a magnified perspective view of a portion of the exemplary rotisserie cooking appliance of FIG. 7.
Figure 10:
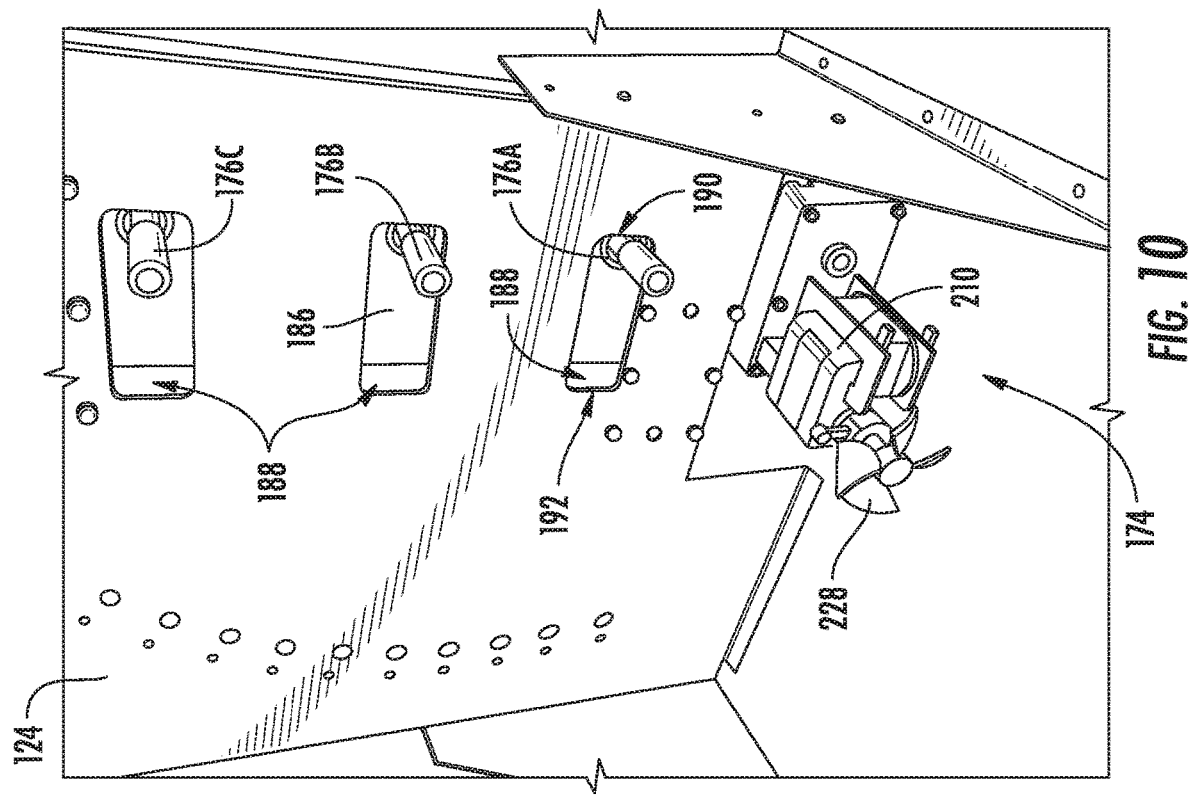
FIG. 10 provides a front perspective view of a drive assembly in a second position within a rotisserie cooking appliance according to exemplary embodiments of the present disclosure.
Figure 9:
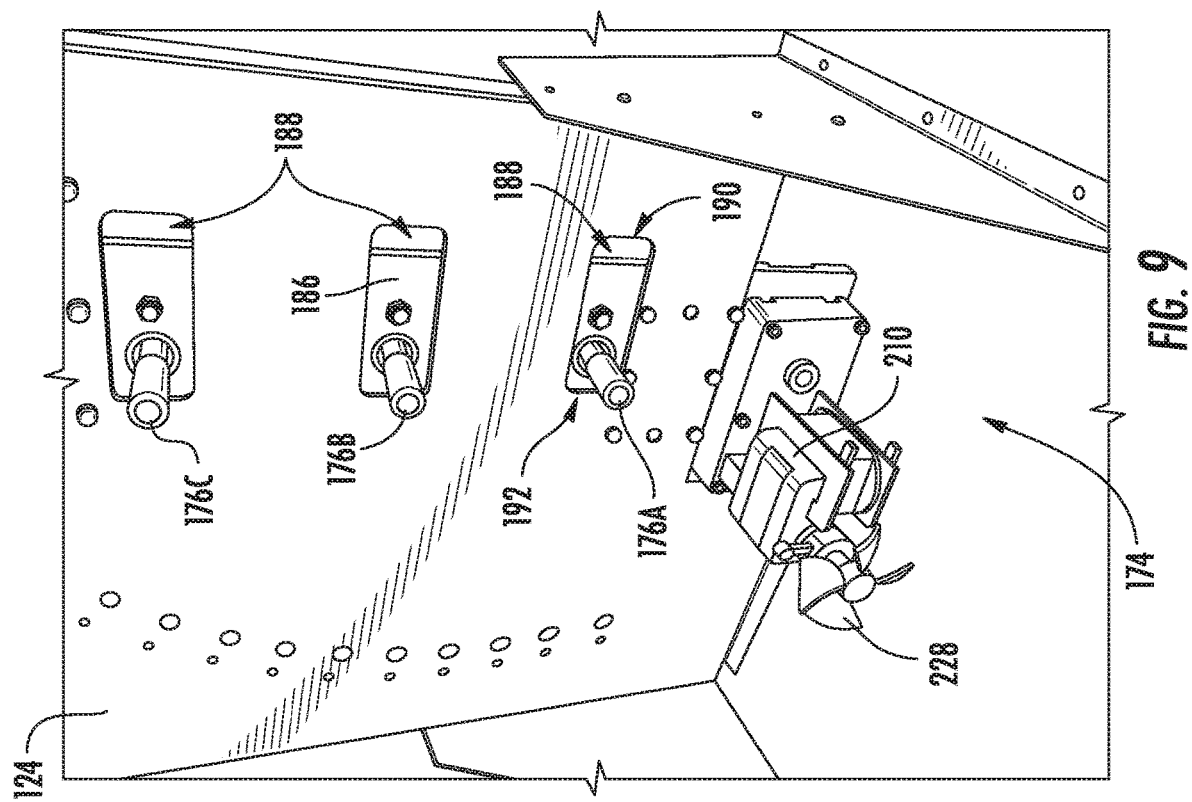
FIG. 9 provides a front perspective view of a drive assembly in a first position within a rotisserie cooking appliance according to exemplary embodiments of the present disclosure.
Figure 12:
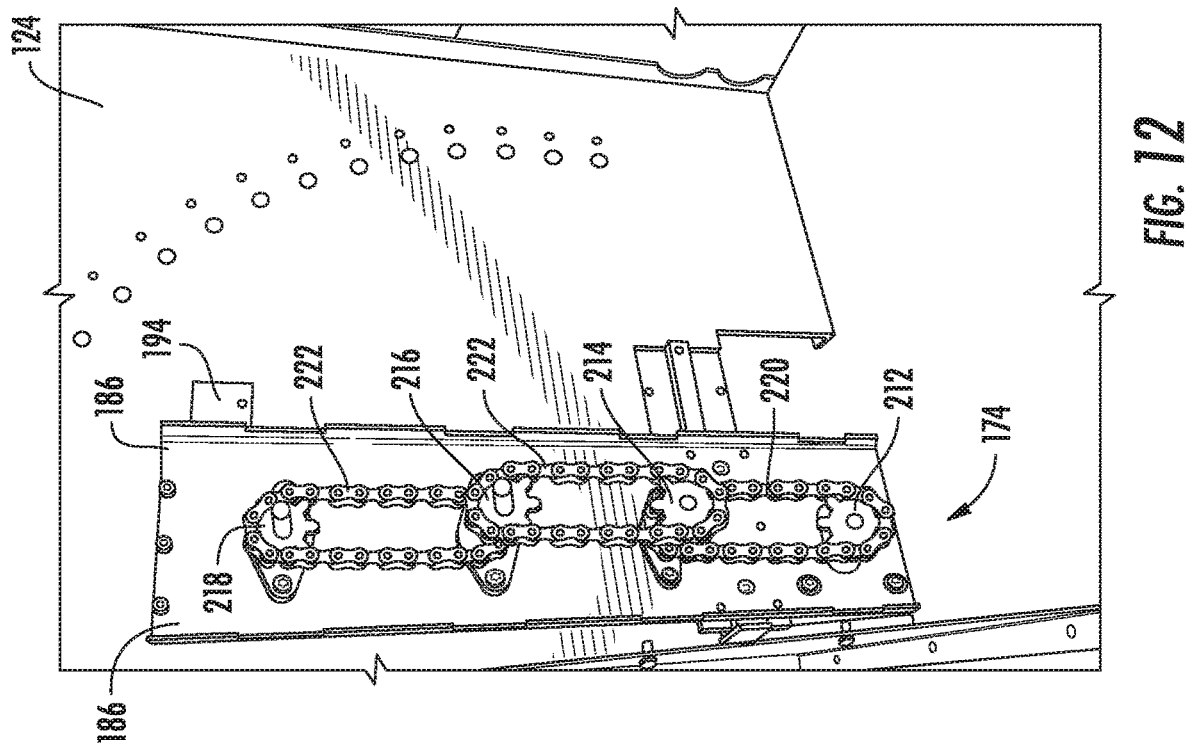
FIG. 12 provides a rear perspective view of a drive assembly in a second position within a rotisserie cooking appliance according to exemplary embodiments of the present disclosure.
Figure 11:
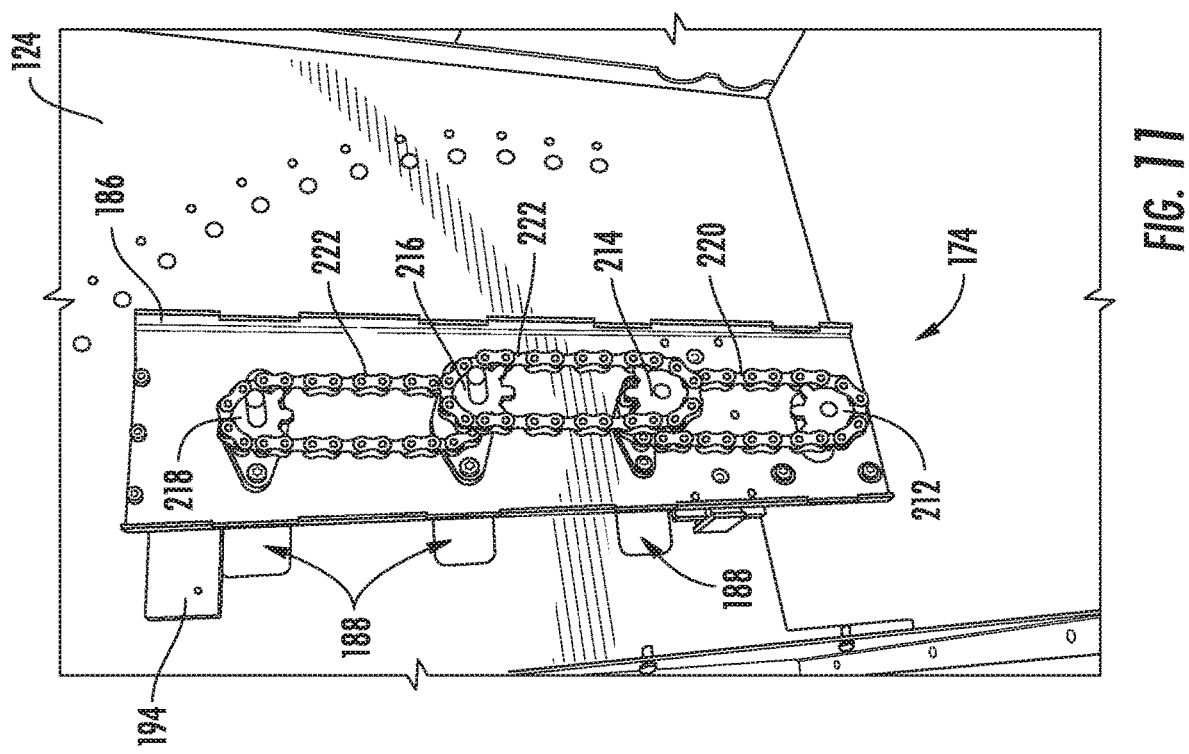
FIG. 11 provides a rear perspective view of a drive assembly in a first position within a rotisserie cooking appliance according to exemplary embodiments of the present disclosure.
Figure 13:
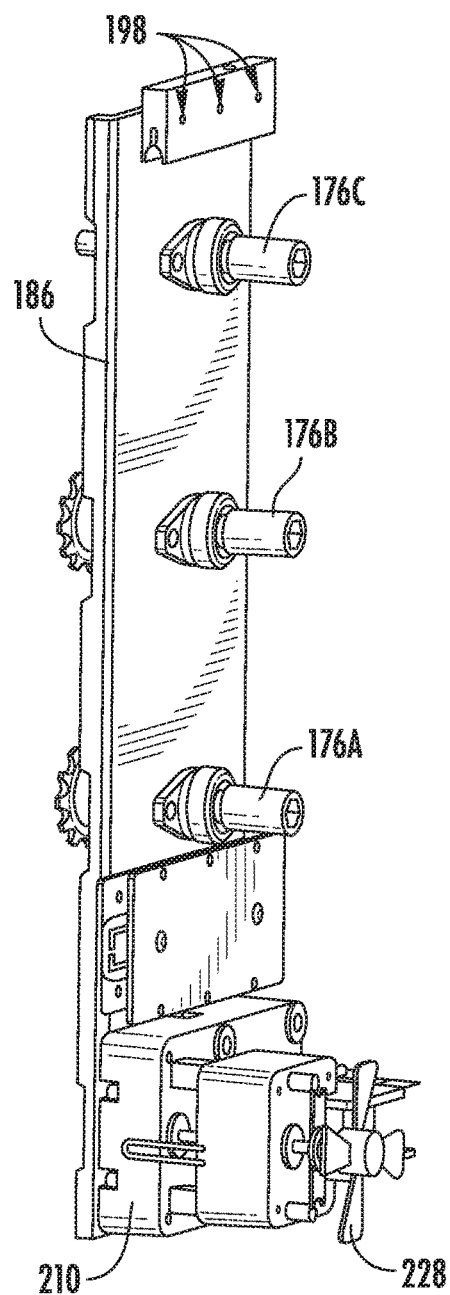
FIG. 13 provides a perspective view of an isolated drive assembly of a rotisserie cooking appliance according to exemplary embodiments of the present disclosure.
Figure 14:
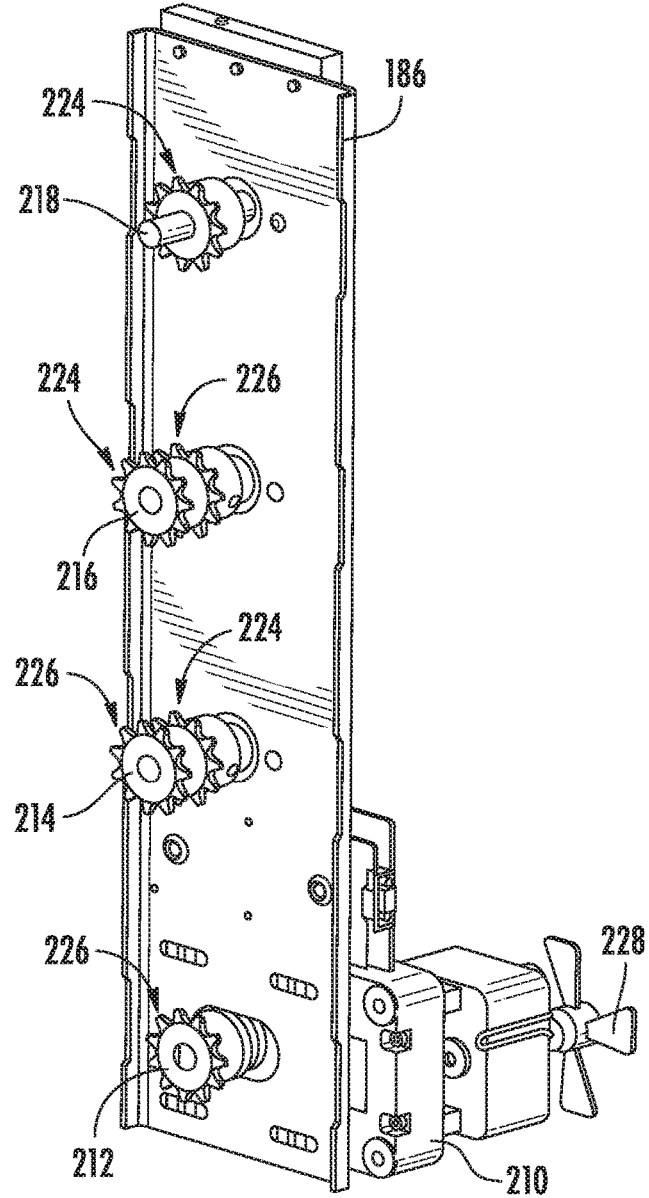
FIG. 14 provides another perspective the isolated drive assembly of FIG. 13.

In exemplary embodiments, a heat shield 142 is mounted within cabinet 102 (e.g., at a rear chamber end of cooking chamber 118). Generally, heat shield 142 may reflect or direct heat within cooking chamber 118 (e.g., forward or towards one or more spit rods 104 within cooking chamber 118). Advantageously, heat and at least a portion of heated air is maintained within cooking chamber 118. As shown, heat shield 142 generally extends between a first end 144 and a second end 146 disposed above the first end 144. Specifically, heat shield 142 extends along a shield plane 148 (see FIGS. 6 and 7) between first end 144 and second end 146. Optionally, first end 144 may be disposed proximal to interior bottom wall 126 (i.e., distal to interior top wall 128) while second end 146 is disposed proximal to interior top wall 128 (i.e., distal to interior bottom wall 126).

Along with the first and second ends 144, 146, shield plane 148 may extend laterally between a left side 150 (e.g., proximal to first chamber side 120) and a right side 152 (e.g., proximal to second chamber side 122). In some embodiments, shield plane 148 is generally defined along the lateral direction L and a perpendicular linear direction or, alternatively, arcuate direction (as shown). Thus, shield plane 148 may be a flat or arcuate plane that a surface (e.g., facing cooking chamber 118) of heat shield 142 lies on. Heat shield 142 may be formed from a single, continuous, integral or unitary piece. Alternatively, heat shield 142 may be formed from multiple discrete panels joined to cabinet 102, as shown.

When assembled, heat shield 142 may be disposed rearward from one or more heating elements 134. Specifically, one or more heating elements 134 may be positioned between cooking chamber 118 and heat shield 142. In some such embodiments, heating elements 134 may be disposed within cooking chamber 118 forward from heat shield 142, as shown. Optionally, heat shield 142 may define an extreme (e.g., rearward extreme) of cooking chamber 118.

In exemplary embodiments, heat shield 142 defines one or more vent channels 154 therethrough. As shown, the vent channels 154 may thus extend perpendicular to the shield plane 148. Additionally or alternatively, the vent channels 154 may extend across the shield plane 148. For example, one or more vent channels 154 may extend (e.g., along the lateral direction L) from left side 150 to right side 152. In optional embodiments, multiple vent channels 154 are spaced apart from each other between the first end 144 and the second end 146, as shown. Each vent channel 154 may be defined parallel to the other vent channels 154.

Figure 5:
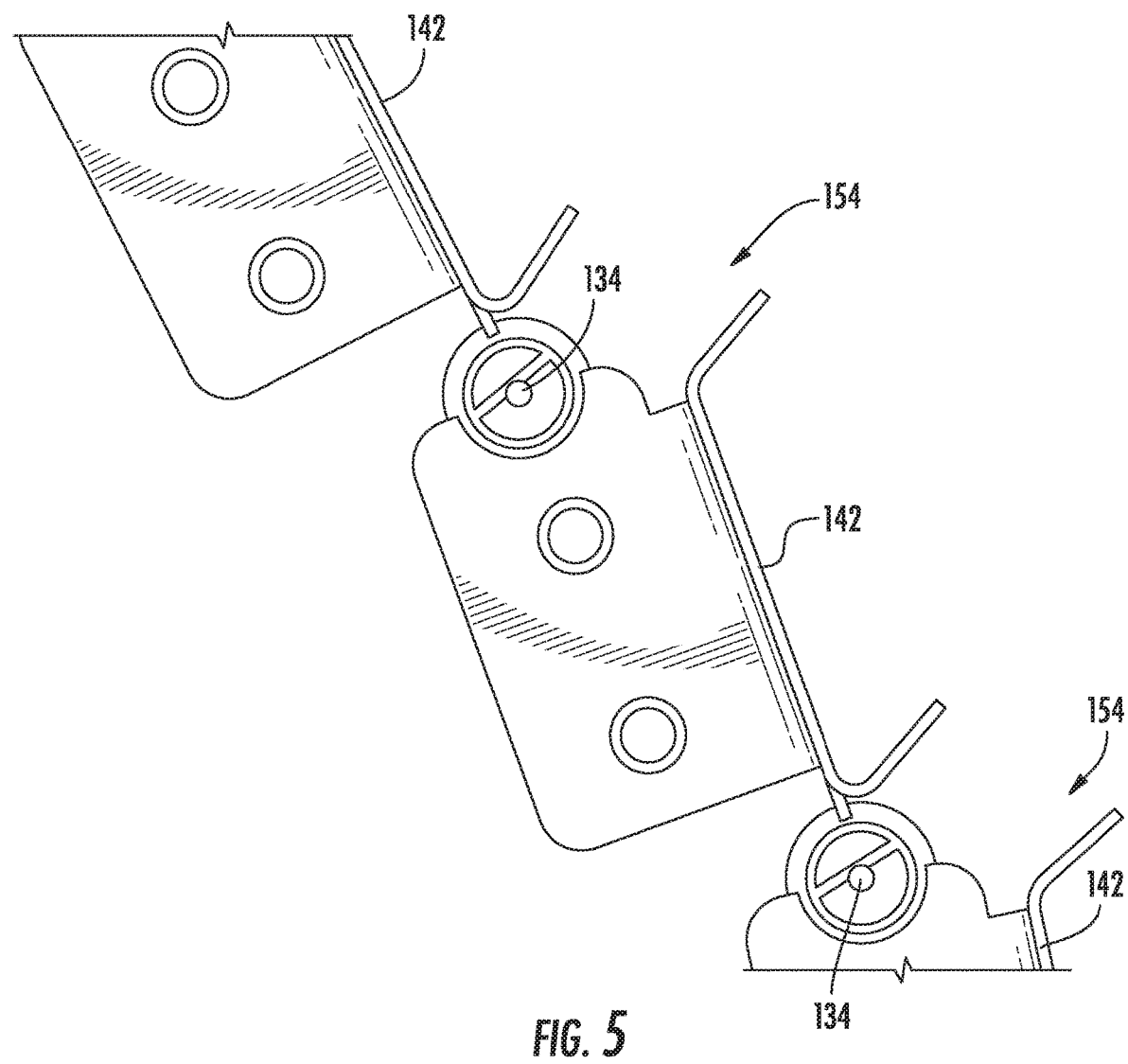
FIG. 5 provides a magnified sectional view of a portion of a heating element and heat shield of the exemplary rotisserie cooking appliance of FIG. 3.

Turning briefly to FIG. 5, a magnified sectional view is provided of a two discrete heating elements 134 within cooking chamber 118 forward from heat shield 142. As shown, one or more of the heating elements 134 may be aligned with a corresponding vent channels 154. Specifically, a corresponding heating element 134 and vent channel 154 may aligned along the shield plane 148. Relative to the direction between first end 144 and second end 146, the position of the aligned heating element 134 may extend into or over the position of the corresponding vent channel 154. Optionally, the aligned heating element 134 may be bounded by vent channel 154 relative to the direction between first end 144 and second end 146. Air passing from cooking chamber 118 to a specific vent channel 154 may generally be directed or forced across the corresponding heating element 134. Advantageously, a tuned volume or flow rate of exhaust air or vapor (e.g., gas, smoke, fumes, etc.) may be directed from cooking chamber 118 through vent channels 154.

Returning especially to FIGS. 3 and 4, cabinet 102 further defines an exhaust path 156 downstream from the cooking chamber 118. As illustrated, at least a portion of the air or vapor (e.g., gas, smoke, fumes, etc.) within cooking chamber 118 may thus be directed or motivated from cooking chamber 118 to exhaust path 156.

Generally, exhaust path 156 extends from cooking chamber 118 to one or more exhaust outlets 158. As shown, an air handler 160 (e.g., fan, blower, etc.) may be provided within exhaust path 156 to motivate an active fluid flow from cooking chamber 118 to one or more of the exhaust outlets 158, as will be described in greater detail below. It is noted that although air handler 160 is shown as a tangential fan, any suitable design may be provided to motivate air or vapor flow through cabinet 102 (e.g., axial fan, cross-flow fan, bladeless indirect viscous-shear fan, etc.).

In some embodiments, heat shield 142 is disposed between cooking chamber 118 and exhaust path 156. Optionally, a rear cavity 166 may be defined behind (e.g., along the transverse direction T) cooking chamber 118 and heat shield 142. For instance, an interior rear wall 129 may extend between the left and right sidewalls 124 at a location within cabinet 102 that is rearward from heat shield 142. Interior rear wall 129 may further be rearward from interior top wall 128 or otherwise define a vertical opening through which exhaust path 156 continues.

In certain embodiments, the vent channels 154 define at least a portion of a fluid (e.g., air or vapor) flow path between cooking chamber 118 and exhaust path 156. Thus, the vent channels 154 may be in fluid communication between cooking chamber 118 and exhaust path 156. Additionally or alternatively, the fluid entering exhaust path 156 may be required to pass over or across at least one heating element 134 prior to entering exhaust path 156. Advantageously, the exhaust air or vapor directed through vent channels 154 may be preheated by heating elements 134 as it evacuates cooking chamber 118 through heat shield 142.

As illustrated, a vapor catalyst 168 may be provided downstream from the cooking chamber 118. Specifically, vapor catalyst 168 may be mounted within the exhaust path 156 upstream from the exhaust outlets 158. For instance, vapor catalyst 168 may span across at least a portion of exhaust path 156 such that fluid from the cooking chamber 118 within exhaust path 156 may be forced to flow across or through vapor catalyst 168 prior to flowing to one or more of the exhaust outlets 158. Optionally, vapor catalyst 168 may be positioned above cooking chamber 118. Additionally or alternatively, vapor catalyst 168 may be positioned rearward (e.g., along the transverse direction T) from one or more of the exhaust outlets 158. Further additionally or alternatively, vapor catalyst 168 may be advantageously disposed upstream of air handler 160 (e.g., at a negative pressure side of exhaust path 156).

Vapor catalyst 168 may be provided as any suitable structure for removing contaminates (e.g., grease or oil) from air flowing therethrough. For instance, vapor catalyst 168 may include a metal (e.g., stainless steel) mesh, lattice, or ribbon restricting airflow while capturing grease. Thus, vapor catalyst 168 may act to clean air or vapor from cooking chamber 118 prior to such air being exhausted from at least one exhaust outlet 158.

In optional embodiments, one or more catalyst heaters 170 or heating elements 134 may be provided to heat air or vapor prior to it flowing to vapor catalyst 168. As shown, the catalyst heaters 170 may be mounted within exhaust path 156 upstream from vapor catalyst 168. At least a portion of fluid through exhaust path 156 downstream from cooking chamber 118 may be forced across a catalyst heater 170, which may in turn be activated to impart heat to the fluid before it enters vapor catalyst 168. Advantageously, the air or vapor that is heated by catalyst heater 170 or heating elements 134 may be received at vapor catalyst 168 (e.g., at a desired temperature for scrubbing or cleaning contaminates from air).

The catalyst heater(s) 170 may be provided as any suitable heating element 134 to generate heat within exhaust path 156 (e.g., separate and spaced apart from heating elements 134 of cooking chamber 118). A catalyst heater 170 may include or be provided as an electric heating element 134 configured to generate heat in response to a received electrical current. For instance, catalyst heater 170 may include or be provided as a resistive element (e.g., resistance wires, ceramic heaters, infrared radiant heat elements, etc.). During use, catalyst heater(s) 170 may be activated to further heat the air or vapor flowing from cooking chamber 118. In some embodiments, the active heating temperature of the catalyst heater 170 is higher than a maximum permitted temperature of the cooking chamber 118 (e.g., maximum temperature of heating elements 134). Thus, the fluid entering vapor catalyst 168 may be provided at a higher temperature than the fluid entering exhaust path 156 from cooking chamber 118.

In some embodiments, cabinet 102 defines an ambient air inlet 172 through cabinet 102 downstream from cooking chamber 118. For instance, ambient air inlet 172 may be defined in fluid communication with exhaust path 156 at a location downstream from the plurality of vent channels 154. Ambient air handler 160 may extend from outer casing 130 of cabinet 102 (e.g., rearward from opening 132) to exhaust path 156, and thus be open to a portion of the ambient environment. As shown, ambient air inlet 172 may further be disposed upstream of air handler 160. As air handler 160 generates an active fluid flow, unheated ambient air may thus be drawn into exhaust path 156 from ambient air inlet 172 and entrain with air or vapor from cooking chamber 118 prior to exiting one or more of the exhaust outlets 158.

Optionally, ambient air inlet 172 may be disposed downstream of vapor catalyst 168 (e.g., and catalyst heaters 170). In other words, ambient air inlet 172 may direct unheated ambient air to a portion of exhaust path 156 downstream from vapor catalyst 168. During use, the unheated air of ambient air inlet 172 may thus cool air or vapor flowing from vapor catalyst 168 (e.g., prior to reaching air handler 160).

As shown, exhaust path 156 terminates at one or more exhaust outlets 158 (e.g., downstream from air handler 160). In some embodiments, an ambient outlet 162 is defined through cabinet 102 downstream from exhaust path 156 to direct fluid from exhaust path 156 to the ambient environment. For instance, ambient outlet 162 may be defined through cabinet 102 at the top portion 106 (e.g., through an upper or front panel of cabinet 102). In particular, ambient outlet 162 may extend along the vertical direction V at a portion of the outer casing 130 between the front portion 114 and rear portion 116 along the transverse direction T. Ambient outlet 162 may be directed away from cooking chamber 118 and cabinet 102 generally. Thus, at least a portion of the fluid flow motivated by air handler 160 may be directed as an exhaust flow from exhaust path 156 to the ambient environment above cabinet 102 through ambient outlet 162. Optionally, ambient outlet 162 may be defined at a location forward from vapor catalyst 168. Additionally or alternatively, ambient outlet 162 may be defined at a location forward from ambient air inlet 172.

In additional or alternative embodiments, a chamber outlet 164 is defined through cabinet 102 downstream from exhaust path 156 to direct fluid from exhaust path 156 to cooking chamber 118. For instance, chamber outlet 164 may be defined through one or more interior walls (e.g., interior top wall 128) at a top end of cooking chamber 118. Chamber inlet 164 may be directed downward or rearward into cooking chamber 118. Thus, at least a portion of the fluid flow motivated by air handler 160 may be directed as an exhaust flow from exhaust path 156 to the cooking chamber 118. Air or vapor within cooking chamber 118 may be further motivated rearward (e.g., toward heat shield 142) by the exhaust flow from chamber outlet 164. Additionally or alternatively, a negative pressure may be generated by the exhaust flow from chamber outlet 164, thereby drawing ambient air through the uncovered opening 132 into cooking chamber 118. Optionally, chamber outlet 164 may be defined at a location forward from vapor catalyst 168. Additionally or alternatively, chamber outlet 164 may be defined at a location forward from ambient air inlet 172.

In some embodiments, multiple exhaust outlets 158 are defined in fluid parallel. Thus, fluid may exit cabinet 102 separately at the discrete exhaust outlets 158 without passing through each exhaust outlet 158. For instance, chamber outlet 164 may be defined in fluid parallel to ambient outlet 162. Fluid exhausted at ambient outlet 162 may bypass chamber outlet 164 or vice versa.

Turning now to FIGS. 6 through 14, various views are provided of appliance 100, or features thereof. As shown, exemplary embodiments of appliance 100 include a rotating rod assembly 174 having one or more rotatable spit rods 104 for supporting food items within cooking chamber 118.

As shown, a spit rod 104 may be disposed (e.g., selectively or removably mounted) within cooking chamber 118. Generally, spit rod 104 includes a longitudinal rod or frame that is rotatable about a rotation axis A. For instance, spit rod 104 (e.g., including the longitudinal rod) may extend along the rotation axis A between first chamber side 120 to second chamber side 122. Spit rod 104 may extend continuously from first chamber side 120 to second chamber side 122 or, alternatively, separably, such as would be provided by a multipiece configuration having one half of spit rod 104 supported at first chamber side 120 and another half of spit rod 104 supported at second chamber side 122. Optionally, one or more food-securing members (e.g., rotisserie forks, clamps, baskets, etc.) may be provided on or as part of spit rod 104 to further hold food on spit rod 104, as would be understood.

When assembled, spit rod 104 may be disposed or mounted within cooking chamber 118 between opening 132 and heat shield 142. In some embodiments, the rotation axis A is parallel to the longitudinal direction L. Optionally, the spit rod 104 may extend and rotate parallel to one or more of the vent channels 154, as shown. Advantageously, an even distribution of heat or airflow may be generated across spit rod 104 (and thus across any food thereon).

Multiple spit rods 104 or mounting locations therefore may be provided within cooking chamber 118. For instance, a separate first spit rod 104 and second spit rod 104 may be mounted within cooking chamber 118 at separate mounting locations. In certain embodiments, the first and second spit rods 104 are spaced apart from each other along the vertical direction V. As shown, the first spit rod 104 may be mounted above the second spit rod 104. Optionally, two or more spit rods 104 may be vertically aligned (e.g., in parallel) such that one spit rod 104 (e.g., first spit rod 104) is directly above another spit rod 104 (e.g., second spit rod 104), as shown.

Generally, each mounting location may include a pair of attachment elements at opposite lateral sides of cooking chamber 118. Thus, a spit rod 104 may be held or supported at both the first and second chamber sides 120, 122. In optional embodiments, the attachment elements include at least one rotatable element, such as a rod coupler or sleeve 176, at one chamber side (e.g., second chamber side 122). For example, a rod sleeve 176 may be rotatably mounted on or proximal to interior sidewall 124 to receive one end of the spit rod 104 and thus secure the spit rod 104 at second chamber side 122. If multiple mounting locations or spit rods 104 are provided, multiple corresponding rod sleeves 176 may be provided, as shown. In additional or alternative embodiments, the attachment elements include at least one static element, such as a cradled shoulder 178. For example, a cradled shoulder 178 may be a fixed, non-rotating member on which one end of a spit rod 104 may be placed and supported. Optionally, a cradled shoulder 178 may be mounted on or proximal to one interior sidewall 124 (e.g., at first chamber side 120). While supported on the cradled shoulder 178, the spit rod 104 may be permitted to rotate (e.g., as motivated at a corresponding rod sleeve 176). If multiple mounting locations or spit rods 104 are provided, multiple corresponding cradled shoulders 178 may also be provided, as shown.

In exemplary embodiments, the transverse location of spit rod 104 within cooking chamber 118 can be selectively varied. Thus, spit rod 104 can be moved forward or rearward within cooking chamber 118 while it is mounted therein. In some such embodiments, a pair of false walls 180, 182 are positioned or mounted within cabinet 102. For instance, a first false wall 180 may be positioned within cooking chamber 118 at first chamber side 120 while a second false wall 182 is positioned within cooking chamber 118 at second chamber side 122.

Each false wall 180 or 182 may be movable or movably mounted within cooking chamber 118. For instance, the false walls 180, 182 may be slidable (e.g., along the transverse direction T). In some such embodiments, each false wall 180 or 182 is independently slidable. In other words, one false wall 180 or 182 may be slid independently of another false wall 182 or 180. Advantageously, food items of a varied shape or an irregular shape may be accommodated and evenly maintained relative to the heating elements 134.

In certain embodiments, one or more of the false walls 180, 182 is slidably joined at opposite sides of a corresponding interior sidewall 124. For instance, a separate interior panel 184 may be positioned within cooking chamber 118 while a separate supporting panel 186 is positioned outside of cooking chamber 118 (e.g., within cabinet 102). In some such embodiments, the corresponding interior sidewall 124 may define a receiving slot 188 through which a joint may extend (e.g., to hold interior panel 184 to supporting panel 186). As shown, receiving slot 188 may be defined through the interior wall 124 (e.g., along the lateral direction L) and extend along the transverse direction T from a front extrema 190 to a rear extrema 192. In some such embodiments, the front and rear extremes 190, 192 may define the sliding range of motion for the corresponding false wall 180 or 182.

In optional embodiments, one or more guide rails 194 are fixed within cabinet 102 in engagement or contact with a corresponding false wall 180 or 182. For instance, a guide rail 194 may be fixed to an interior sidewall 124 opposite from cooking chamber 118 in slidable engagement with a corresponding supporting panel 186. Supporting panel 186 may thus slide along guide rail 194 (e.g., as the false wall 180 or 182 moves between the front and rear extremes 190, 192). In some such embodiments, multiple preset transverse positions are defined on guide rail 194 (e.g., between the front and rear extremes 190, 192). As an example, multiple detents 196 may be defined on guide rail 194 at discrete, spaced apart, transverse locations. One or more complementary mating notches 198 provided on the corresponding false wall 180 or 182 (e.g., at supporting panel 186) may selectively rest on or within the detents 196 at a preset transverse position. When rested within a detent 196 at the preset transverse position, the mating notches 198 may partially restrict transverse movement such that a greater transverse force is required to move a false wall 180 or 182 from the preset transverse position than would be required to move the false wall 180 or 182 between two adjacent preset transverse positions.

As shown, a motor 210 (e.g., in communication with controller 136) may be provided in selective mechanical communication with one or more spit rods 104 to motivate rotation thereof. For example, motor 210 may be mechanically connected to a rod sleeve 176 at which a spit rod 104 can be selectively received. Thus, when a spit rod 104 is mounted within cooking chamber 118, motor 210 may drive or rotate the spit rod 104 about the corresponding rotation axis A.

As shown, exemplary embodiments of rotating rod assembly 174 connect motor 210 to rod sleeve 176 through a gear train assembly. The gear train assembly may include, for example, a driving gear 212 extending from or fixed to motor 210. One or more driven gears (e.g., 214, 216, 218) may extend from or be fixed to each rod sleeve 176. A primary chain 220 may connect the driving gear 212 and at least one driven gear (e.g., 214, 216, or 218). In embodiments where multiple rod sleeves 176 or spit rods 104 are provided, one or more secondary chains 222 may connect motor 210 to additional rod sleeves 176. If three or more rod sleeves 176 are provided, multiple secondary chains 222 may be daisy chained, as shown. Optionally, one or more of the rod sleeves (e.g., 176A, 176B, 176C) may include a driven gear (e.g., 214, 216, or 218) with discrete (e.g., laterally spaced) receiver and output teeth sets 224, 226 to facilitate the daisy-chained connection.

For instance, a primary chain 220 looped around an output teeth set 226 driving gear 212 and a receiver teeth set 224 of a first driven gear 214 may connect motor 210 directly to a first rod sleeve 176A. A secondary chain 222 looped around an output teeth set 226 on first driven gear 214 and a receiver teeth set 224 on second driven gear 216 may connect the first rod sleeve 176A to the second rod sleeve 176B. Motor 210 can thus be indirectly connected to second rod sleeve 176B. A secondary chain 222 looped around an output teeth set 226 on second driven gear 216 and a receiver teeth set 224 on a third driven gear 218 may connect the second rod sleeve 176B to a third rod sleeve 176C. Motor 210 can thus also be indirectly connected to third rod sleeve 176C.

In certain embodiments, motor 210 is mounted to one or more of the false walls 180, 182 (e.g., second false wall 182). Thus, as the corresponding false wall 180 or 182 moves, the motor 210 may also move (e.g., along the transverse direction T). In some such embodiments, motor 210 is mounted to a bottom end of supporting panel 186 (e.g., below one or more rod sleeves 176). When assembled, motor 210 may be held below cooking chamber 118 (e.g., beneath interior bottom wall 126—FIG. 2). Optionally, a cooling fan 228 may be fixed to motor 210 to rotate therewith (e.g., simultaneously with the driving gear 212) and generate a cooling airflow across motor 210 as heat is generated within cooking chamber 118.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking appliance defining a mutually-orthogonal vertical direction, lateral direction, and transverse direction, the cooking appliance comprising:
    a cabinet defining a cooking chamber, the cooking chamber extending along the lateral direction between a first chamber side and a second chamber side;
    a heating element mounted within the cabinet;
    a first false wall slidably positioned within the cooking chamber at the first chamber side;
    a second false wall slidably positioned within the cooking chamber at the second chamber side; and
    a spit rod defining a rotation axis from a first rod end to a second rod end, the first rod end attached to the first false wall to slide therewith, the second rod end attached to the second false wall to slide therewith,
    wherein the first false wall is slidable along the transverse direction independently from the second false wall.

2. The cooking appliance of claim 1, further comprising a motor in selective mechanical communication with the spit rod to motivate rotation thereof.

3. The cooking appliance of claim 2, wherein the motor is mounted to the second false wall to slide therewith.

4. The cooking appliance of claim 2, wherein the spit rod is a first spit rod, wherein the cooking appliance further comprises a second spit rod spaced apart from the first spit rod along the vertical direction within the cooking chamber.

5. The cooking appliance of claim 4, further comprising a plurality of chains connecting the motor to the first and second spit rods.

6. The cooking appliance of claim 1, further comprising an interior sidewall fixed within the cabinet at the second chamber side, the interior sidewall defining a receiving slot extending therethrough along the lateral direction, wherein the second false wall is slidably disposed on the interior sidewall, wherein a rod sleeve extends through the receiving slot on the second false wall, and wherein the spit rod is secured to the second false wall on the rod sleeve.

7. The cooking appliance of claim 1, further comprising a heat shield mounted within the cabinet rearward from the spit rod, the heat shield extending along a shield plane from a first end to a second end.

8. The cooking appliance of claim 7, wherein the heat shield defines a vent channel extending from the first end to the second end.

9. The cooking appliance of claim 8, wherein the heating element is aligned with the vent channel along the shield plane from the first end to the second end.

10. A cooking appliance defining a mutually-orthogonal vertical direction, lateral direction, and transverse direction, the cooking appliance comprising:
    a cabinet defining a cooking chamber, the cooking chamber extending along the lateral direction between a first chamber side and a second chamber side;
    a plurality of electric heating elements mounted within the cabinet;
    a first false wall slidably positioned within the cooking chamber at the first chamber side;
    a second false wall slidably positioned within the cooking chamber at the second chamber side, the second false wall being independently slidable relative to the first false wall;
    a spit rod defining a rotation axis from a first rod end to a second rod end, the first rod end attached to the first false wall to slide therewith, the second rod end attached to the second false wall to slide therewith; and
    a heat shield mounted within the cabinet rearward from the spit rod, the heat shield extending along a shield plane from a first end to a second end, wherein the heat shield defines a vent channel extending from the first end to the second end.

11. The cooking appliance of claim 10, further comprising a motor in selective mechanical communication with the spit rod to motivate rotation thereof.

12. The cooking appliance of claim 11, wherein the motor is mounted to the second false wall to slide therewith.

13. The cooking appliance of claim 11, wherein the spit rod is a first spit rod, wherein the cooking appliance further comprises a second spit rod spaced apart from the first spit rod along the vertical direction within the cooking chamber.

14. The cooking appliance of claim 13, further comprising a plurality of chains connecting the motor to the first and second spit rods.

15. The cooking appliance of claim 10, further comprising an interior sidewall fixed within the cabinet at the second chamber side, the interior sidewall defining a receiving slot extending therethrough along the lateral direction, wherein the second false wall is slidably disposed on the interior sidewall, wherein a rod sleeve extends through the receiving slot on the second false wall, and wherein the spit rod is secured to the second false wall on the rod sleeve.

16. The cooking appliance of claim 10, wherein a heating element of the plurality of electric heating elements is aligned with the vent channel along the shield plane from the first end to the second end.

17. A cooking appliance defining a mutually-orthogonal vertical direction, lateral direction, and transverse direction, the cooking appliance comprising:
- a cabinet defining a cooking chamber, the cooking chamber extending along the lateral direction between a first chamber side and a second chamber side;
- a heating element mounted within the cabinet;
- an interior sidewall fixed within the cabinet at the second chamber side, the interior sidewall defining a receiving slot extending therethrough along the lateral direction;
- a first false wall slidably positioned within the cooking chamber at the first chamber side;
- a second false wall slidably disposed on the interior sidewall;
- a rod sleeve extending through the receiving slot on the second false wall; and
- a spit rod defining a rotation axis from a first rod end to a second rod end, the first rod end attached to the first false wall to slide therewith, the second rod end attached to the second false wall on the rod sleeve to slide with the second false wall.

18. The cooking appliance of claim 17, further comprising a motor in selective mechanical communication with the spit rod to motivate rotation thereof,
wherein the motor is mounted to the second false wall to slide therewith.

19. The cooking appliance of claim 17, further comprising a motor in selective mechanical communication with the spit rod to motivate rotation thereof,
wherein the spit rod is a first spit rod, wherein the cooking appliance further comprises a second spit rod spaced apart from the first spit rod along the vertical direction within the cooking chamber.

20. The cooking appliance of claim 19, further comprising a plurality of chains connecting the motor to the first and second spit rods.

* * * * *